United States Patent
Maguire et al.

(10) Patent No.: US 10,179,696 B2
(45) Date of Patent: Jan. 15, 2019

(54) VARIABLE OPENING SLIDE GATE FOR REGULATING MATERIAL FLOW INTO AIRSTREAM

(71) Applicants: Stephen B. Maguire, West Chester, PA (US); Novatec, Inc., Baltimore, MD (US)

(72) Inventors: Stephen B. Maguire, West Chester, PA (US); James Zinski, Ellicott City, MD (US)

(*) Notice: Subject to any disclaimer, the term of this patent is extended or adjusted under 35 U.S.C. 154(b) by 0 days.

(21) Appl. No.: 15/006,587

(22) Filed: Jan. 26, 2016

(65) Prior Publication Data

US 2016/0214793 A1 Jul. 28, 2016

Related U.S. Application Data

(60) Provisional application No. 62/108,122, filed on Jan. 27, 2015.

(51) Int. Cl.
| | |
|---|---|
| *B65D 90/58* | (2006.01) |
| *G01F 11/24* | (2006.01) |
| *G01F 11/40* | (2006.01) |
| *B65G 53/04* | (2006.01) |
| *B65D 90/66* | (2006.01) |

(52) U.S. Cl.
CPC ........... *B65D 90/587* (2013.01); *B65D 90/66* (2013.01); *B65G 53/04* (2013.01); *G01F 11/24* (2013.01); *G01F 11/40* (2013.01); *B65D 2590/668* (2013.01)

(58) Field of Classification Search
CPC .......... B65D 90/587; B65D 90/66; B65D 2590/668; B65D 90/582; B65G 53/04; G01F 11/24; G01F 11/46; G01F 11/40; G01G 13/04; G01G 13/22
USPC .................................................. 251/62, 63.5
See application file for complete search history.

(56) References Cited

U.S. PATENT DOCUMENTS

| | | |
|---|---|---|
| 1,001,510 A | 8/1911 | Curbey |
| 1,418,096 A | 5/1922 | Royer |
| 1,579,251 A | 4/1926 | Schossow |
| 2,116,912 A | 5/1938 | Richardson |
| 2,161,190 A | 6/1939 | Paull |

(Continued)

FOREIGN PATENT DOCUMENTS

| | | |
|---|---|---|
| CN | 202302166 U | 7/2012 |
| DE | 3541532 A1 | 5/1986 |

(Continued)

OTHER PUBLICATIONS

Written Opinion for PCT Application No. PCT/US2016/12411, dated Mar. 2, 2016.

(Continued)

*Primary Examiner* — Kaitlin S Joerger
(74) *Attorney, Agent, or Firm* — Fox Rothschild LLP

(57) ABSTRACT

Apparatus for delivering controlled amounts of granular resin into a conveying conduit includes a hopper for storing the resin, an air cylinder, a double-ended piston within the air cylinder, passive and active piston rods extending from opposite sides of the piston out of the ends of the cylinder, and a slide gate connected to the active piston rod, with the slide gate being positioned between a discharge opening of the hopper and an opening in the conveying conduit.

15 Claims, 5 Drawing Sheets

(56) References Cited

U.S. PATENT DOCUMENTS

| | | |
|---|---|---|
| 2,351,035 A | 6/1944 | Grant, Jr. |
| 2,403,689 A | 7/1946 | Sprague |
| 2,601,654 A | 6/1952 | Wright |
| 2,655,934 A | 10/1953 | Charles |
| 2,718,435 A | 9/1955 | Hudspeth |
| 2,765,812 A | 10/1956 | Werner |
| 2,917,077 A | 12/1959 | Ziege |
| 3,111,115 A | 11/1963 | Best |
| 3,115,276 A | 12/1963 | Johanningmeier |
| 3,122,162 A | 2/1964 | Sands |
| 3,151,628 A | 10/1964 | Heckert |
| 3,164,141 A | 1/1965 | Jones |
| 3,209,898 A | 10/1965 | Beebe et al. |
| 3,239,278 A | 3/1966 | Mueller |
| 3,348,848 A | 10/1967 | Lucking et al. |
| 3,367,362 A | 2/1968 | Hoffman |
| 3,381,708 A | 5/1968 | Chenoweth |
| 3,434,493 A | 3/1969 | Owens |
| 3,468,338 A | 9/1969 | Patterson |
| 3,470,994 A | 10/1969 | Schnell et al. |
| 3,621,873 A | 11/1971 | Kenann |
| 3,667,087 A | 6/1972 | Dakin |
| 3,735,777 A | 5/1973 | Katzer et al. |
| 3,773,300 A | 11/1973 | Hauser |
| 3,794,077 A | 2/1974 | Fanshier |
| 3,861,830 A | 1/1975 | Johnson |
| 3,872,884 A | 3/1975 | Busdiecker |
| 3,931,953 A * | 1/1976 | Allen ............... F16K 3/188 251/175 |
| 3,951,461 A | 4/1976 | De Feudis |
| 3,959,636 A | 5/1976 | Johnson et al. |
| 3,985,262 A | 10/1976 | Nauta |
| 4,005,908 A | 2/1977 | Freeman |
| 4,026,442 A | 5/1977 | Orton |
| 4,108,334 A | 8/1978 | Moller |
| 4,148,100 A | 4/1979 | Moller |
| 4,174,731 A | 11/1979 | Sturgis |
| 4,183,467 A | 1/1980 | Sheraton |
| 4,219,136 A | 8/1980 | Williams et al. |
| 4,221,510 A | 9/1980 | Smith |
| 4,262,878 A * | 4/1981 | O'ffill ............... F16K 3/188 251/175 |
| 4,269,223 A | 5/1981 | Carter et al. |
| 4,284,261 A | 8/1981 | Benjamin |
| 4,294,020 A | 10/1981 | Evans |
| 4,342,443 A | 8/1982 | Wakeman |
| 4,354,622 A | 10/1982 | Wood |
| 4,373,838 A | 2/1983 | Foreman |
| 4,402,436 A | 9/1983 | Hellgren |
| 4,402,635 A | 9/1983 | Maruo |
| 4,454,943 A | 6/1984 | Moller |
| 4,475,672 A | 10/1984 | Whitehead |
| 4,498,783 A | 2/1985 | Rudolph |
| 4,501,518 A | 2/1985 | Smith |
| 4,508,091 A | 4/1985 | Wakeman |
| 4,511,291 A | 4/1985 | Quates, Sr. |
| 4,525,071 A | 6/1985 | Horowitz et al. |
| 4,581,704 A | 4/1986 | Mitsukawa |
| 4,586,854 A | 5/1986 | Newman |
| 4,705,083 A | 11/1987 | Rossetti |
| 4,756,348 A | 7/1988 | Moller |
| 4,793,711 A | 12/1988 | Ohlson |
| 4,812,086 A | 3/1989 | Kopernicky |
| 4,830,508 A | 5/1989 | Higuchi et al. |
| 4,834,385 A | 5/1989 | Jackson |
| 4,842,198 A | 6/1989 | Chang |
| 4,848,534 A | 7/1989 | Sandwall |
| 4,850,703 A | 7/1989 | Hanaoka et al. |
| 4,962,831 A | 10/1990 | Dundas |
| 4,995,422 A | 2/1991 | Chew |
| 5,011,043 A | 4/1991 | Whigham |
| 5,054,965 A | 10/1991 | Clark |
| 5,110,521 A | 5/1992 | Moller |
| 5,116,547 A | 5/1992 | Tsukahara et al. |
| 5,132,897 A | 7/1992 | Allenberg |
| 5,143,166 A | 9/1992 | Hough |
| 5,147,152 A | 9/1992 | Link |
| 5,148,943 A | 9/1992 | Moller |
| 5,172,489 A | 12/1992 | Moller |
| 5,225,210 A | 7/1993 | Shimoda |
| 5,232,314 A | 8/1993 | Hopkins |
| 5,244,179 A | 9/1993 | Wilson |
| 5,252,008 A | 10/1993 | May, III et al. |
| 5,261,743 A | 11/1993 | Moller |
| 5,285,930 A | 2/1994 | Nielsen |
| 5,340,949 A | 8/1994 | Fujimura et al. |
| 5,341,961 A | 8/1994 | Hausam |
| 5,378,089 A | 1/1995 | Law |
| 5,415,321 A | 5/1995 | Gehlert |
| 5,423,455 A | 6/1995 | Ricciardi et al. |
| 5,575,309 A | 11/1996 | Connell |
| 5,575,596 A | 11/1996 | Bauer |
| 5,613,516 A | 3/1997 | Landrum |
| 5,651,401 A | 7/1997 | Cados |
| 5,669,265 A * | 9/1997 | Adler ............... F16H 61/30 251/62 |
| 5,704,391 A | 1/1998 | McGowan et al. |
| 5,767,453 A | 6/1998 | Wakou et al. |
| 5,767,455 A | 6/1998 | Mosher |
| 5,780,779 A | 7/1998 | Kitamura et al. |
| 5,791,830 A | 8/1998 | Fort |
| 5,794,789 A | 8/1998 | Payson |
| 5,843,513 A * | 12/1998 | Wilke ............... G01F 11/40 222/409 |
| 6,007,236 A | 12/1999 | Maguire |
| 6,036,407 A | 3/2000 | Nester |
| 6,076,803 A | 6/2000 | Johnson |
| 6,085,777 A * | 7/2000 | Welker ............... F17D 3/10 137/317 |
| 6,089,794 A | 7/2000 | Maguire |
| 6,102,629 A | 8/2000 | Ishida |
| 6,152,656 A | 11/2000 | Curtis et al. |
| 6,158,363 A | 12/2000 | Memory et al. |
| 6,199,583 B1 | 3/2001 | Iacovella |
| 6,227,768 B1 | 5/2001 | Higuchi |
| 6,379,086 B1 | 4/2002 | Goth |
| 6,386,800 B1 | 5/2002 | van Eyck |
| 6,413,020 B1 | 7/2002 | Davison |
| 6,419,418 B1 | 7/2002 | Smith |
| 6,447,215 B1 | 9/2002 | Wellmar |
| 6,497,083 B1 | 12/2002 | Garwood |
| 6,585,004 B1 | 7/2003 | Porter |
| 6,588,988 B2 | 7/2003 | Zlotos |
| 6,634,375 B2 | 10/2003 | Olivas |
| 6,644,345 B2 | 11/2003 | Dulin |
| 6,648,558 B1 | 11/2003 | Shultz |
| 6,786,681 B2 | 9/2004 | Grasshoff |
| 6,834,755 B2 | 12/2004 | Jay |
| 6,871,618 B2 * | 3/2005 | Masse ............... F01L 1/465 123/90.12 |
| 6,890,129 B2 | 5/2005 | Fabbri |
| 6,923,601 B2 | 8/2005 | Goth |
| 6,942,133 B2 | 9/2005 | Frankeberger |
| 6,981,619 B2 | 1/2006 | Moretto |
| 7,066,689 B2 | 6/2006 | Maguire |
| 7,080,960 B2 | 7/2006 | Burnett |
| 7,114,889 B2 | 10/2006 | Kanou |
| 7,117,886 B2 | 10/2006 | Kajitani |
| 7,137,729 B2 | 11/2006 | Moretto |
| 7,188,434 B2 | 3/2007 | Moretto |
| 7,191,807 B2 | 3/2007 | DeMaison |
| 7,192,222 B2 | 3/2007 | Van Mullekom |
| 7,231,927 B2 | 6/2007 | Suehara |
| 7,311,474 B1 | 12/2007 | Ogasahara |
| 7,318,459 B2 | 1/2008 | Frankeberger |
| 7,384,018 B2 | 6/2008 | Moretto |
| 7,472,494 B2 | 1/2009 | Moretto |
| 7,503,128 B2 | 3/2009 | Moretto |
| 7,662,211 B2 | 2/2010 | Federico |
| 7,766,037 B2 | 8/2010 | Moenkhaus |
| 7,766,305 B2 * | 8/2010 | Kim ............... F16K 3/184 251/158 |
| 8,021,462 B2 | 9/2011 | Moretto |
| D650,888 S | 12/2011 | Moretto |

(56) References Cited

U.S. PATENT DOCUMENTS

| | | |
|---|---|---|
| 8,070,844 B2 | 12/2011 | Maguire |
| 8,092,070 B2 | 1/2012 | Maguire |
| 8,113,745 B2 | 2/2012 | Aoki |
| D671,563 S | 11/2012 | Moretto |
| D671,564 S | 11/2012 | Moretto |
| 8,322,951 B2 | 12/2012 | Kvalheim |
| 8,360,691 B2 | 1/2013 | Moretto |
| 8,408,228 B1 | 4/2013 | Jimenez |
| 8,412,383 B2 | 4/2013 | Moretto |
| D688,711 S | 8/2013 | Moretto |
| 8,672,194 B2 | 3/2014 | Moretto |
| 8,753,432 B2 | 6/2014 | Maguire |
| 8,763,273 B2 | 7/2014 | Moretto |
| 8,793,900 B2 | 8/2014 | Moretto |
| D718,791 S | 12/2014 | Moretto |
| 8,905,681 B2 | 12/2014 | Schneider |
| 8,914,990 B2 | 12/2014 | Moretto |
| 9,181,044 B1 | 11/2015 | Baker |
| 9,365,367 B2 | 6/2016 | Kraemer |
| 9,371,198 B2 | 6/2016 | Maguire |
| 9,459,183 B1 | 10/2016 | Schnakenberg |
| 9,550,635 B2 | 1/2017 | Maguire |
| 9,550,636 B2 | 1/2017 | Maguire |
| 9,604,793 B2 | 3/2017 | Maguire |
| 9,637,320 B2 | 5/2017 | Moretto |
| 9,663,263 B2 | 5/2017 | Moretto |
| 2002/0061232 A1 | 5/2002 | Zlotos |
| 2002/0136609 A1 | 9/2002 | Maguire |
| 2003/0168618 A1* | 9/2003 | Coney ............... F01L 1/46 251/48 |
| 2004/0115013 A1 | 6/2004 | Goth |
| 2004/0221893 A1 | 11/2004 | Johnson |
| 2005/0012058 A1* | 1/2005 | Medina ............ F15B 11/036 251/31 |
| 2005/0039816 A1* | 2/2005 | Maguire ............ B29C 31/00 141/8 |
| 2005/0089378 A1 | 4/2005 | Gerber |
| 2005/0265793 A1 | 12/2005 | Van Mullekom |
| 2008/0314461 A1 | 12/2008 | Moretto |
| 2009/0031580 A1 | 2/2009 | Moretto |
| 2009/0039106 A1 | 2/2009 | Moretto |
| 2009/0090018 A1 | 4/2009 | Stein |
| 2009/0151800 A1 | 6/2009 | Salmento |
| 2009/0295016 A1 | 12/2009 | Shinohara |
| 2011/0211919 A1 | 9/2011 | Rasner |
| 2011/0299943 A1 | 12/2011 | Woolever |
| 2012/0201917 A1 | 8/2012 | Shinohara |
| 2013/0202370 A1 | 8/2013 | Moretto |
| 2013/0209180 A1 | 8/2013 | Moretto |
| 2015/0175282 A1 | 6/2015 | Thompson |
| 2015/0232287 A1 | 8/2015 | Maguire |
| 2015/0232289 A1 | 8/2015 | Maguire |
| 2015/0232290 A1 | 8/2015 | Maguire |
| 2015/0308584 A1* | 10/2015 | Ehrne ............... F16K 3/184 251/62 |
| 2015/0321860 A1 | 11/2015 | Maguire |
| 2016/0096693 A1 | 4/2016 | Hanaoka |
| 2016/0158967 A1 | 6/2016 | Maguire |
| 2016/0167897 A1 | 6/2016 | Wiemers |
| 2016/0244275 A1 | 8/2016 | Maguire |
| 2016/0272439 A1 | 9/2016 | Kelly |
| 2016/0280473 A1 | 9/2016 | Veselov |
| 2016/0292953 A1 | 10/2016 | Brown |
| 2016/0347557 A1 | 12/2016 | Tell |
| 2017/0174447 A1 | 6/2017 | Baker |

FOREIGN PATENT DOCUMENTS

| | | |
|---|---|---|
| DE | 3923241 | 1/1991 |
| DE | 4323295 | 2/1995 |
| EP | 0318170 | 5/1989 |
| EP | 0507689 | 10/1992 |
| EP | 0587085 | 9/1994 |
| EP | 0743149 | 11/1996 |
| FR | 2109840 | 5/1972 |
| FR | 2235775 | 1/1975 |
| FR | 2517087 | 5/1983 |
| GB | 203758 A | 9/1923 |
| GB | 271930 A | 6/1927 |
| GB | 2081687 | 2/1982 |
| JP | 1235604 | 9/1989 |
| JP | 4201522 | 7/1992 |
| JP | 6114834 | 4/1994 |

OTHER PUBLICATIONS

International Search Report for PCT Application No. PCT/US2016/12411, dated Mar. 2, 2016.
Written Opinion for PCT Application No. PCT/US2016/19455, dated May 13, 2016.
International Search Report for PCT Application No. PCT/US2016/19455, dated May 13, 2016.
Introduction to Pneumatic Conveying of Solids, Karl Jacob, The Dow Chemical Company, originally delivered on Sep. 8, 2010.
Sheet of 2 photographs of Mould-Tek gravimetric blender, circa 1993.
Sheet of 2 photographs of Motan gravimetric blender and feeding system with Maguire Products, Inc. controls, circa 1993.
Sheet of 3 photographs of UNA-DYN gravimetric blender, circa 1993.
Sheet of 2 photographs of Maguire Products, Inc. gravimetric blender with Conair hoppers and feeding system, circa 1993.
Sheet of 1 photograph of Hydracolor gravimetric blender, circa 1993.
Advertisement entitled "Machinery and Systems for Extrusion is Our Only Business" by Process Control Corporation, circa 1993.
Advertisement entitled "Weigh Blender Delivers Unmatched Accuracy" by Universal Dynamics, Inc., circa 1993.
Advertisement entitled "A Full Line-up of Blender Solutions . . . Priced Right" by HydReclaim, circla 1993.
Advertisement entitled "NEW FROM HydReclaim—Now Processors Can Economically Achieve Continuous Gravimetric Blending" by HydReclaim, circa 1993.
Article entitled "Control Loading Systems" from Plastics Technology, Oct. 1995, p. 41.
Advertisement "Introducing our 400 VME-II Gravimetric Blender" by HydReclaim Corporation, circa 1993.
Four page brochure entitled "Gravimix Better Quality through Research", circa 1993.
Four page brochure entitled "Conomix Plus Volumetric Blender" dated Aug. 1993.
Four page brochure entitled "Conair Franklin Autocolor Y Mezclador" dated Mar. 1995.
Two-sided flyer entitled "GB 140 Series Compact Auto Weigh Blender" published by Conair Franklin in the United States, Jun. 1994.
Six page brochure entitled "Graviblend Precise Continuous Weigh Blenders" published by Ktron Vertech, Jun. 1991, United States.
Six page brochure entitled "Piovan Gravimetric Blenders MDW" published by Piovan Sri, Oct. 1993, Venezia, Italy.
One page two-sided flyer entitled "Gravimix, The New Gravimetric Blending Generation" published by Ferlin, De demsvaard, Holland, circa 1993.
Four page brochure entitled "When you Weigh it All Up . . . " published by Ferlin Trading, Holland, circa 1993.
Thirty-two page catalog entitled "Maguire Color Blending Equipment" published by Maguire Products, Inc., 1993, United States.
Two page brochure entitled "Mould-Tek Bulk Handling Systems" published by Mould-Tek Industries, Inc. in Canada, circa 1993.
Brochure entitled "Plastic Molders and Extruders: published by Maguire Products, Inc., 1995".
Five page brochure entitled "Blending power: GXB Blender The Better Alternative" of Mould-Tek, circa 1998.
Forty-four page two-sided brochure including cover and back pages entitled "Maguire: Auxiliary equipment for the plastics industry" of Maguire Products, Inc., Oct. 2000.

(56) References Cited

OTHER PUBLICATIONS

Two-sided color brochure entitled "Convey, Blend, Dry" published by Novatec, Inc., undated.
Three page two-sided color brochure entitled "Accuracy, flexibility and performance are at your fingertips with ConveyPacer III Series "S" Controller" of Mould-tek, 1999.
Seven page two-sided color brochure plus cover entitled "Exac-U-Batch Series Weigh Scale Blenders: Engineered to be the ultimate blend of precision and control!" of Mould-tek, 2000.
Three page two-sided color brochure entitled "We have the building blocks to integrate your entire plastics bulk handling system." of Mould-tek, 1999.
Two page two-sided color brochure entitled "Model GXB-2202 Exac-U-Batch Gravimetric Scale Blender: Accurate weigh scale blending under precise computer control" of Mould-tek, 2000.
One page, two-sided color brochure entitled "Bulk handling power: the manufacturer of the world's most advanced blender gives you the same performance in bulk handling systems" of Mould-Tek, dated Apr. 1999.
Three page two-sided color brochure entitled "Portable Drying and Conveying Systems: Nomad™ Series Portable Dryers", AEC Whitlock, 1998.
Two page two-sided color brochure entitled "Drying Systems: WD Series Dehumidifying Dryers" of AEC Whitlock, 1997.
19 page document entitled "Model MLS—Clear Vu Eight Component Vacuum Loading System: Operation Manual" of Maguire Products, Inc. dated May 4, 1999.
One page two-sided color brochure entitled "Maguire Clear-Vu™ Loading System" of Maguire Products, Inc.
Four page two-sided color brochure entitled "Novatec Inc. Vacuum Loaders—Electro-Polished Stainless Steel Finish" of Novatec Inc., undated.
Eight page two-sided color brochure entitled "Novatec Inc. Material Conveying Solutions for the Plastics Industry", 1999.
Two page two-sided color brochure entitled Maguire Model MPM Pre-Mixers of Maguire Products, Inc., Apr. 1997.
Two page two-sided color brochure entitled "WDMR Series Compact Dryers" of AEC Whitlock, 1998.
Two page two-sided color reprint entitled "10 most frequently asked questions about Dryers" by Joseph Dziediz, AEC/Whitlock, from Plastics Technology, Jan. 1998.
Two page two-sided color brochure entitled "Drying Systems: WD Series High Capacity Dehumidifying Dryers" of AEC Whitlock, 1997.
Five page two-sided color brochure entitled "AEC Auxiliaries As Primary", AEC, Inc., 1999.

* cited by examiner

VARIABLE OPENING SLIDE GATE FOR REGULATING MATERIAL FLOW INTO AIRSTREAM

CROSS-REFERENCE TO RELATED PATENT APPLICATION

This patent application claims the benefit of the priority under 35 USC 119 and 35 USC 120 of provisional U.S. patent application Ser. No. 62/108,122 filed 27 Jan. 2015 in the names of Stephen B. Maguire and James Zinski. The disclosure of '122 application is hereby incorporated by reference.

BACKGROUND OF THE INVENTION

The Technology

The plastics industry is very diversified; there are thousands of different products, hundreds of materials, and dozens of processes, and all are very different from one another. The only thing all these share in common is that the source material is some type of plastic.

Equipment sold to this industry is, therefore, very diversified in design. Plastics factories have multiple process machines, sometimes several hundred in one location. Virtually all plastics fabricating operations require that each process machine, namely a molding press or an extruder, be supplied automatically with the required raw resin material on a continuous basis. This resin may be supplied in large boxes called "Gaylords" in fiber drums, in 50 pound bags, or more typically may be delivered by bulk truck or rail car, with the resin material then being transferred in bulk into storage silos. In all cases the resin material must be further distributed throughout the plant to each and every process machine. For that reason a great deal of design and capital expense is devoted to the automatic distribution of the raw resin material throughout the plant.

These resin distribution systems, which are typically pneumatic systems with material flow being in an airstream drawn by a vacuum pump, more commonly referred to as "loading systems", must deal with many variables. One set of variables includes the type, shape, size and consistency of the granular plastic resin material.

Plastic resin pellets, nominally about ⅛ inch in maximum cross-section, come in various shapes, with round, square, and cylindrical being the most common.

Flowing resin powder is also an option, and very fine but free flowing resin pellets and other granular materials may be conveyed as well, The design variables to be considered for each customer include:

1. Type of resin being conveyed.
2. Size and consistency of the resin pellets.
3. Distances the resin pellets are to be conveyed.
4. Variability of these distances from shortest to longest.
5. Acceptable range for velocity of resin material travel through the lines.
6. Throughput rate of resin required for each process machine.
7. Total throughput rate of resin for the entire plant.
8. Excess capacity performance margin so a molding or extrusion process is not interrupted by short term loading issues.
9. Loss of resin material from or at the supply so that only air is being pulled by the vacuum pump, thereby reducing system vacuum levels and reducing overall design throughput.
10. Loading sequence, or priority, when multiple receiver stations call for material to be supplied to the process machines, either molding presses or extrudes.
11. Detecting problems and alarm conditions.
12. Proper air to material ratio for resin conveying by the vacuum pump.
13. Detecting plugged material flow lines due to poor resin flow or over feeding of resin material.
14. Dust condition and filter requirements.
15. Reliability.
16. Serviceability.
17. Ease of use.
18. Cost
19. Vacuum pump type, namely positive displacement, regenerative, and others.
20. Vacuum pump horsepower and rated CFM capacity as well as vacuum levels.

In all of these areas, system designers look to find improved methods and solutions whenever possible.

One of the most important considerations in a pneumatic conveying system is to maintain a correct velocity for the conveyed resin material. The type of resin material dictates the target conveying speed. To maximize the resin material transfer rate, a high conveying speed is preferred, and air speed in any case must be sufficient to keep the resin pellets suspended and moving in the air stream. But velocity must be limited so as not to damage the pellets. Hard, brittle pellets can fracture and break when conveyed, resulting in excessive dust.

Softer pellets can skid along the conduit walls, causing "angel hair" as a result of the plastic resin melting at the point of high speed contact with the conduit wall; this leaves a thin "angel hair" film on the wall. As a result, strings of very thin "angel hair" accumulate, effectively reducing diameter of the conduit and causing problems in the system.

Air speed and resin conveying velocity are directly related to vacuum pump capacity (rated Cubic Feet per Minute or "CFM") and horsepower, as well as the material conveying line diameter. There is always a correct velocity "range" for each type of resin material. It is a design challenge to assure that resin material is conveyed within the correct velocity range.

Conveying distances affect system design. Conveying over short distances requires a less powerful vacuum source than over longer distances. Systems are generally sized to produce the best compromise for material velocity between the shortest and longest conveying distance.

Required conveying rate usually dictates line size (conduit diameter), and this in turn dictates the CFM required to maintain correct velocity in a given diameter conduit. This means different conduit sizes in the same system can be a problem if one vacuum pump is to draw air and resin through several different diameter conveying lines. Pumps have known CFM ratings. Pulling air through a small conduit will result in higher velocity flow than pulling the same CFM through a larger conduit.

The type of vacuum pump to be selected is important. Regenerative blowers deliver wide ranging CFM depending on vacuum level. Positive displacement type pumps deliver high vacuum levels, and have a flatter CFM curve over their vacuum range. Regenerative blowers are quieter and generally cost less. Positive displacement blowers may require sound enclosures and tend to cost more, but are generally more reliable and more forgiving as respecting dust in the air.

The simplest systems use a fixed speed motor to drive the vacuum pump, and a single size conveying line to serve all receivers regardless of distance, rate requirement, or material.

VFD (Variable Frequency Drive) motors allow vacuum pumps to operate at different speeds, and therefore at different CFM rates, with the vacuum pump pulling different vacuum levels depending on preset information about each receiver being served, and/or making adjustments based on real time feedback of vacuum sensors located at various places in the system.

The addition of a SCFM (Standard Cubic Feet per Minute) air flow limiter in the air flow line allows oversized vacuum pumps to be used without risk of conveying at excessive velocity. SCFM limiters restrict air flow to a preset rate. This maintains the desired CFM air flow at the inlet to the conveying system, which is critical for proper conveying for a given size conveying line.

Reading vacuum levels at various points tells the controlling processor if the line is open, which means only air and no material is present and air is flowing unrestrictedly. This signals a loss of material at the source. A high vacuum reading indicates a plugged or nearly plugged line. Normal conditions are present where material is flowing correctly at detected mid-vacuum levels.

One line size for all receivers assures the resin transport velocity is more likely to be in the acceptable range. However, most processes require the base resin material to be delivered at fifty (50) times the rate of additives, such as color concentrate. Virgin (or natural) resin pellets may have to be loaded at a rate of 1000 pounds per hour, requiring a 2.5 or 3 inch line size, while colorant material is only required to be delivered at a rate of 20 to 40 pounds an hour. A smaller receiver is used for colorant material, namely a first receiver that loads perhaps 5 pounds at a time, while a second receiver for the virgin resin material will be larger, perhaps loading 50 pounds of granular resin material for each loading cycle. A 2.5 inch line on such a 5 pound receiver would be too large. 1.5 inch line would be standard, and the use of 1.0 inch resin conveying line would be better. But this risks velocities that are excessive resulting in trade-offs in design.

By placing an air flow limiter at the vacuum pump suction intake, one can limit the maximum CFM (Cubic Feet per Minute) air flow to the design limit of the air flow limiter device such as that disclosed and claimed in pending U.S. patent application Ser. No. 14/185,016 published as US 2015/0232287-A1 on 20 Aug. 2015, issued as U.S. Pat. No. 9,371,198 on 21 Jun. 2016.

SUMMARY OF THE INVENTION

In one of its aspects, this invention provides apparatus for delivering variably controlled amounts of granular plastic resin material into a pneumatic conveying conduit. In this manifestation of the invention, the apparatus may include a hopper for storing the resin, and an air cylinder with a double-ended piston being located within the air cylinder. The double-ended piston is moveable within this air cylinder in response to differential air pressures on either side of the piston.

This implementation of the invention desirably includes a "passive" piston rod extending from a first side of the piston out of one end of the cylinder and an "active" piston rod extending from a second side of the piston out of a second end of the cylinder. A slide gate is connected to the "active" piston rod. The slide gate is positioned between a discharge opening in a hopper and an opening in the conveying conduit.

Desirably the active piston rod is aligned with the axis of the cylinder.

The slide gate desirably comprises a housing and a blade, with the housing having upper and lower openings that are preferably at least somewhat aligned. The blade is desirably moveable, preferably slidably, within the housing from a position at which communication between the upper and lower openings is blocked by the blade and a position at which the upper and lower openings are in communication one with another due to the blade being retracted. The blade is desirably positionable at any location between the opening blocking position and the opening communicating position; the blade is positionable at a continuum of positions between the blocking and opening positions.

In another one of its aspects, this invention provides apparatus for delivering variably controlled amounts of granular resin material into a conveying conduit. The apparatus desirably includes a hopper for storing the resin and an air cylinder, with a double-ended piston resident within the air cylinder. The piston moves within the air cylinder in response to differential air pressures on either side of the piston. A passive piston rod extends from a first side of the piston out of one end of the cylinder. An active piston rod extends from a second side of the piston out of the second end of the cylinder. A slide gate is connected to the active piston rod. The slide gate is positioned between a discharge opening of the hopper and an opening in the resin conveying conduit.

Desirably the active piston rod is aligned with the axis of the cylinder. Also desirably the passive piston rod is aligned with the axis of the cylinder.

The slide gate desirably includes a housing and a blade, with the housing having upper and lower openings that are aligned. The blade is desirably moveable within the housing from a position at which communication between the upper and lower openings is blocked and a position at which the upper and lower openings are in communication one with another. The blade is desirably positionable at any location between the opening blocking position and the opening communication position.

In yet another one of its aspects, this invention provides a method for supplying controlled amounts of granular resin material to a conveying conduit for vacuum or pneumatic conveyance of the granular material through the conveying conduit. In this method aspect of the invention, a hopper is provided for storage of granular plastic resin material therein. A double-ended air cylinder is provided having a piston moveably disposed within the double-ended air cylinder. Piston rods extend from opposite sides of the piston through opposite ends of the cylinder.

In this method aspect of the invention, a slide gate is further provided and positioned between an outlet of the hopper and an inlet to the conveying conduit. The hopper is elevated relative to the conduit for gravity-induced granular plastic resin flow downwardly out of the hopper to the conveying conduit. The invention proceeds with connection of a moveable portion of the slide gate to one of the piston rods and thereafter further proceeds in applying differential air pressure to opposite sides of the piston to move the piston and the slide portion of the slide gate to vary the amount of granular resin material flowing from the hopper into the conveying conduit.

In yet another one of its aspects, this invention provides a method for supplying controlled amounts of granular resin material to a conveying conduit for vacuum or pneumatic conveyance of the granular resin material through the conveying conduit. The method begins with providing a hopper for storage of granular resin material therein. The method proceeds by providing a double-ended air cylinder having a piston moveably disposed therein. Next the method proceeds by providing piston rods extending from opposite sides of the piston through opposite ends of the cylinder. The method proceeds with providing a slide gate positioned between an outlet of the hopper and an inlet to the conveying conduit. The method further proceeds by connecting a movable portion of the slide gate to one of the piston rods and concludes by applying differential pressure, desirably air pressure, to opposite sides of the piston to move the piston and a slide portion of the slide gate to vary the amount of granular resin material flowing from the hopper into the conveying conduit.

DESCRIPTION OF THIS INVENTION

Figure 1:
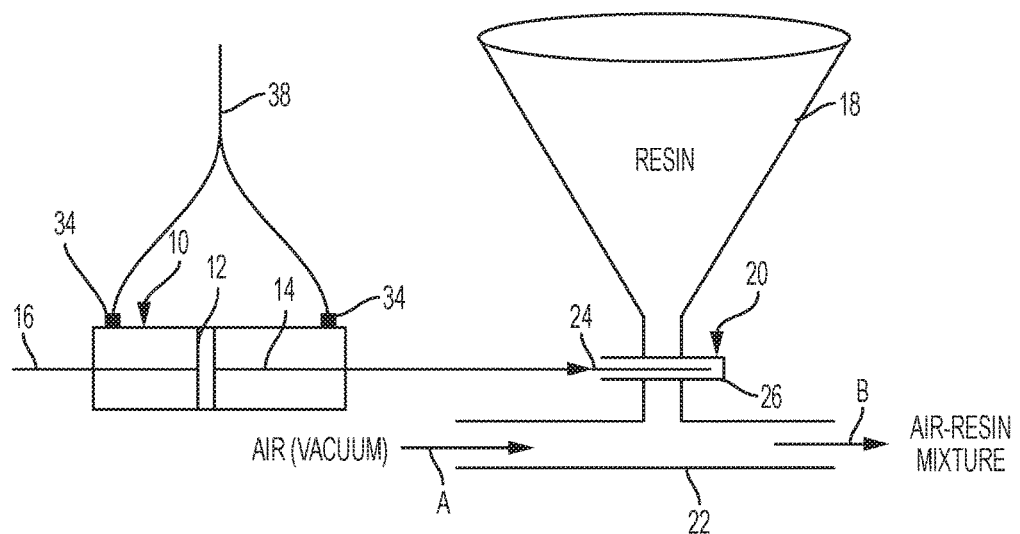
FIG. 1 is a schematic drawing illustrating apparatus manifesting aspects of the invention and showing the path of air or vacuum through a conduit as the air or vacuum carries resin material to a desired destination.

In pneumatic and vacuum powered resin conveying systems, one of the most critical functions is the delivery of granular resin into the moving air stream at a controlled rate. If the rate of delivery is too fast, the air stream will not be able to move the resin and the resin will collect below the entry point into the air stream. If the rate of delivery is too slow, insufficient resin will be carried to the required destination with possible damage occurring to the granular resin pellets during such conveyance, especially if the conveying speed is too high.

This invention uses a balanced air cylinder and careful timing to open a slide gate valve a specific distance to introduce resin into a pneumatic or vacuum conveying conduit and then to hold the valve at that position if desired or to move the slide gate if desired to change the rate of delivery of resin to the conveying conduit. Feedback may be used to dynamically change the position of the slide gate to adjust the rate of delivery of the granular resin material to the connecting conduit.

In a system that operates cyclically, the lowest cost method to repeatedly open a valve such as a slide gate to a desired position is to restrict the exit air flow on the actuating cylinder connected to the slide gate and to accurately time the piston-cylinder actuating solenoid valve "on" time so the slide gate opens the same amount, consistently with each cycle.

This invention further relates to any controlled opening valve, to modulate resin material flow rate into a conveying air stream. The amount of opening of the slide gate may be altered in real time, during a resin material load cycle, or on a load cycle by load cycle basis, with each load cycle opening being corrected based on previous load cycle results.

Controlled slide gate opening at the resin material pick-up point serves to adjust the air-resin material ratio based on feedback from vacuum sensing devices.

The invention preferably employs a cylinder that is balanced. Specifically the cylinder has a shaft coming out each end of the cylinder, from either side of the piston within the cylinder, so that the piston will not move when equal air pressure is applied to each side of the piston, from opposite ends of the cylinder.

Conventionally, an air cylinder has a rod coming out of one end, and that "rod" side of the piston does not have the same area (and hence does not exert the same force when equal air pressures are applied to both sides of the piston) as the other side of the piston that has no rod. The piston side with no rod, having more effective area, where equal air pressures are applied to both sides of the piston will push with more force than the side with the rod.

The solution provided by this invention is to have a second rod coming out of the back of the cylinder so that both sides of the piston have rods, and therefore both sides of the piston have equal surface area and therefore experience equal pressures and exert equal forces when equal air pressures are applied to both sides of the piston.

The invention preferably further involves placement of flow control valves on each input port of the cylinder, with the ports being located on opposite sides of the piston, and then supplying air to each port through two separate solenoid valves. In the normal "at rest" position, the normally open ports of the solenoid valves supply full air pressure to each end of the cylinder. To move the piston, the invention actuates one solenoid valve, allowing one end of the cylinder to exhaust. A flow control valve allows the exhausting air to escape slowly and the piston moves slowly in that direction. The moving piston allows forces in the cylinder to remain balanced. If the flow control valve is closed at any time, the piston will stop and hold at that position.

The process desirably starts with the slide gate closed. No resin material is flowing. The vacuum pump starts and full conveying air is flowing, directly below the slide gate, though the conveying conduit. The controller, based on previous results, powers the correct flow control valve for a precise time period that is intended to allow the slide gate to open the exact amount to provide the ideal air-resin material mix for maximum conveying.

There is preferably always a vacuum gauge at the vacuum pump inlet, with the vacuum pump powering the resin conveying system and drawing the required vacuum in the conveying conduit. If a vacuum gauge reading is too high, this indicates the line is plugged or close to being plugged, which means resin material is being fed into the air stream at too high a rate. If the vacuum gauge reading is too low, this indicates too much air is flowing and not enough resin material is flowing, indicating that the slide gate did not open far enough.

In the first case, where too much resin material is flowing, the invention preferably closes the slide gate right away and then reopens the slide gate to a more restricted position.

In the second case where resin material flow is insufficient, the invention desirably pulses the slide gate a little more to open the slide gate further. In all cases the invention, specifically a microprocessor controlling the valves, needs to allow sufficient time to see the results of the corrections before further adjusting the slide gate.

Referring to FIG. 1, a double ended cylinder 10 includes a piston 12 resident therewithin. There are two piston rods associated with piston 12. An active piston rod 14 extends out of cylinder 10 and connects piston 12 with a slide gate 20. A passive piston rod 16 extends from the other side of piston 12, in the opposition direction and out of cylinder 10, as illustrated. With two piston rods 14, 16, one rod 14 being active and used to actuate slide gate 20 and the other piston rod 16 being passive, control of piston 12, either pneumatically or hydraulically, can be very precise, since each side of piston 12 has the same area exposed to pressurized air or other fluid. As a result, a small change in pressure on either side of piston 12 causes piston 12 to move in a desired direction.

In FIG. 1, a pair of valves, one for each side of double-ended cylinder 10 on either side of piston 12, are provided and designated 34. Valves 34 receive pressurized fluid from a reservoir or other supply, not shown, via a pressurized fluid supply line 38. Various types of valves may be used for valves 34 so long as the valves used can be tightly controlled as to their operation and input of pressurized fluid, desirably air but also possibly a liquid such as oil, into either side of double-ended cylinder 10 to move piston 12 in accordance with the invention. Controls for valves 34 are not illustrated in FIG. 1, but are understood to be present.

Slide gate 20 is positioned below a hopper 18 in which resin material to be conveyed resides. Slide gate 20 includes a slide gate blade 24 resident within a slide gate housing 26. When slide gate blade 24 is retracted due to movement of piston 12 to the left in FIG. 1, slide gate 20 opens, thereby allowing additional resin material to flow downwardly out of hopper 18 and into conduit 22. Conduit 22 has air flowing therethrough as indicated by arrow "A" in FIG. 1. The air may be at positive pressure in pneumatically driven resin delivery systems or, more desirably, be at a slight negative pressure in vacuum driven resin delivery systems.

Resin falling from hopper 18 through slide gate 20 falls into conduit 22, where the moving air picks up the resin and carries it in a direction indicated by arrow "B" as an air-resin mixture. Very small changes in pressure on either side of piston 12 serve to move piston 12 slowly and in the case of slight pressure difference on either side of piston 12, piston 12 moves only a very small distance. This allows very precise control of the position of slide gate blade 24, which thereby controls the size of the opening in slide gate 20 through which the resin falling downwardly must pass. This results in ultrafine control of the amount of resin introduced into conduit 22 for conveyance therethrough by the air moving through conduit 22.

Figure 2:
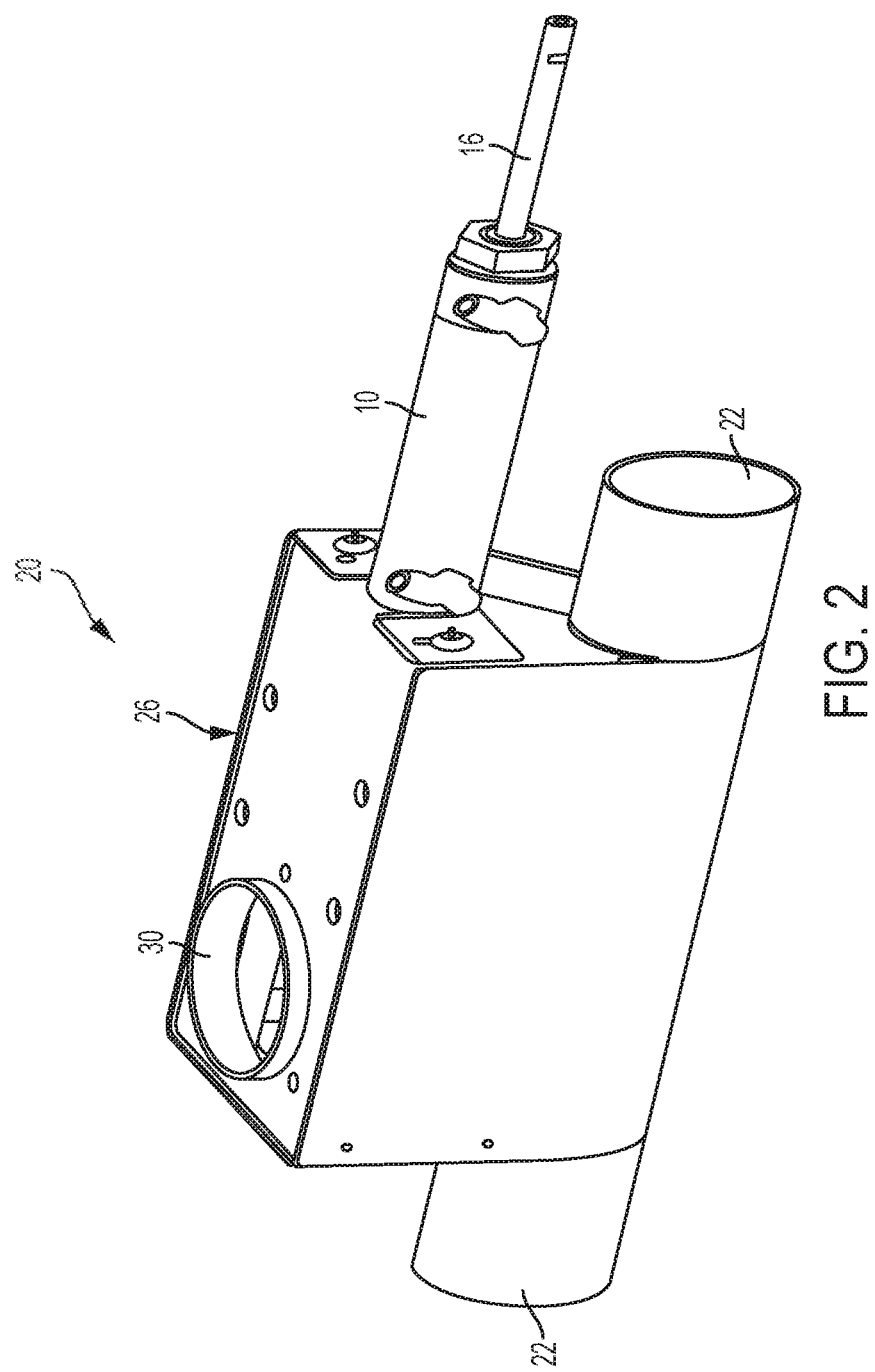
FIG. 2 is an engineering drawing of an implementation of apparatus manifesting aspects of the invention.
Figure 3:
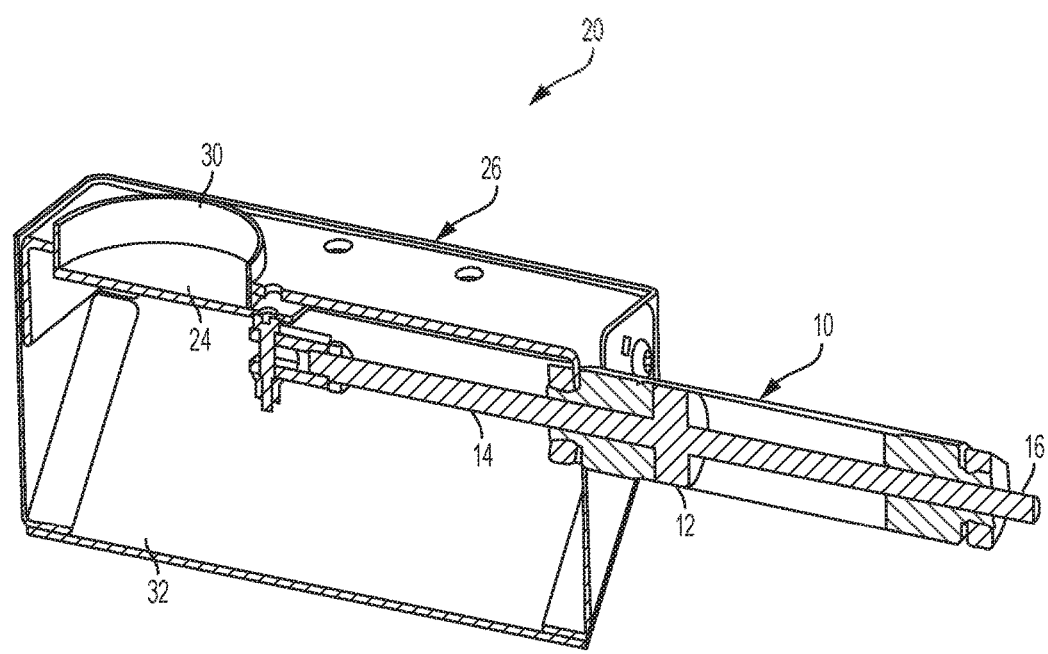
FIG. 3 is an elevation view, in section, of the apparatus illustrated in FIG. 2 showing positioning of the slide gate and double ended piston portions of the invention with the slide gate in a closed position.
Figure 4:
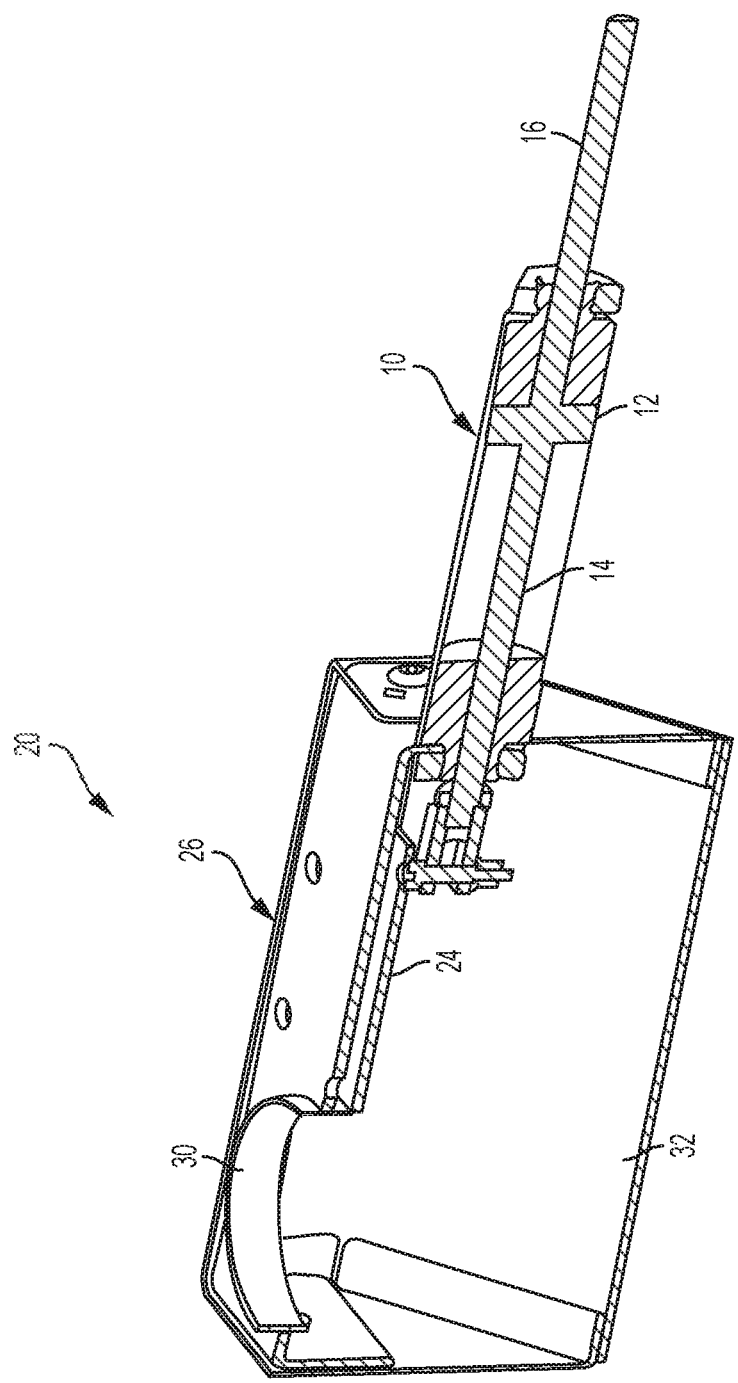
FIG. 4 is, similarly to FIG. 3, an elevation view, in section, of the apparatus illustrated in FIG. 2 showing positioning of the slide gate and double ended piston portions of the invention with the slide gate in an open position.

FIGS. 2, 3 and 4 show a possible engineering implementation of apparatus embodying the invention. In these Figures, parts corresponding to those shown only schematically in FIG. 1 have been correspondingly numbered.

In FIG. 2, slide gate housing 26 encloses slide gate blade 24. A cylinder 10 extends from one end of housing 26. A passive piston rod 16 extends from cylinder 10 as indicated in FIG. 2. Conduit 22 enters and exits slide gate housing 26, as is readily apparent from FIG. 2.

FIG. 3, being a vertical section of the apparatus illustrated in FIG. 2, shows slide gate 20 in a closed position with slide gate blade 24 occluding an opening 30 in slide gate housing 26 through which granular resin material may flow downwardly from a hopper, not shown, positioned above slide gate housing 26. A ramp 32 within housing 26 is positioned to force downwardly flowing granular resin material into a longitudinal opening, not shown, in conduit 22. The longitudinal opening extends, desirably, the length of slide gate housing 26 in the direction of movement of piston 12. In FIG. 3, piston 12 is at a position at which slide gate 20 is closed with slide gate blade 24 occluding opening 30, thereby precluding flow of any granular material downwardly out of a hopper, which would be mounted above slide gate housing 26, into conduit 22.

FIG. 4 illustrates slide gate 20 in an open position thereby permitting downward flow of granular resin material through opening 30, contacting ramp 32 and flowing downwardly further into conduit 22. In FIG. 4, slide gate blade 24 has been moved to a fully retracted position thereby permitting maximum downward flow of granular resin material through opening 30.

By application of small differential pressures to either side of piston 12, piston 12 can be moved slowly or rapidly very small distances thereby to move slide gate blade 24 slowly or rapidly very small distances and thereby permit accurate metering of downward flow of granular resin material out of a hopper 18 and into a conduit 22.

Figure 5:
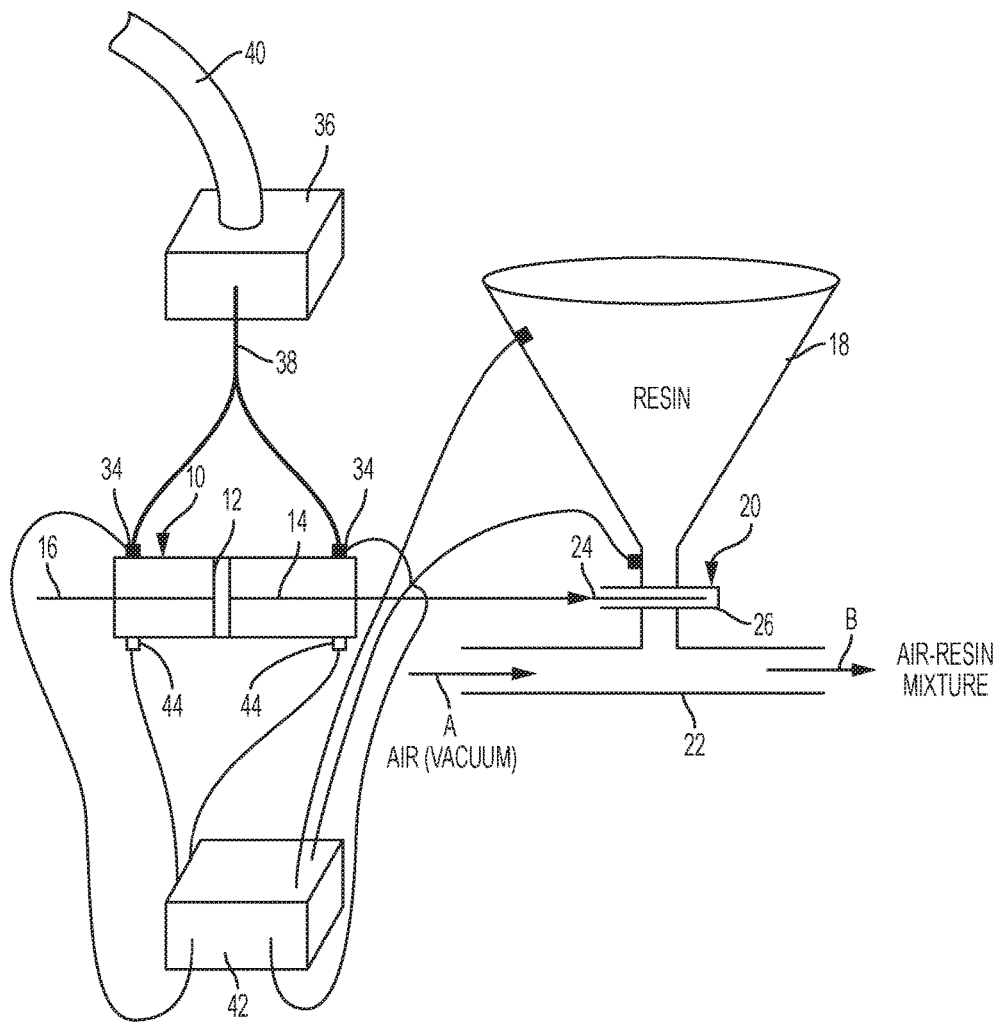
FIG. 5 is a schematic drawing, similar to FIG. 1, illustrating alternative valves and control aspects of the invention.

Referring to FIG. 5, double-ended cylinder 10 is illustrated together with double-ended piston 12, active piston rod 14, and passive piston rod 16. A hopper 18 contains granular plastic resin material or other granular material therein for feeding downwardly into a conduit or other receptacle. A slide gate 20, includes a slide gate blade 24 and a slide gate housing, and is positioned between the downward outlet of hopper 18 and a conduit 22, to which granular plastic resin material or other granular material is to be fed from hopper 18 into conduit 22 in a controlled manner.

Active piston rod 14 is connected, preferably rigidly, to slide gate blade 24 as illustrated in FIG. 5. Valves 34 supply fluid, desirably air, under pressure and are furnished with that fluid via pressurized fluid supply line 38, which leads downwardly to valves 34 from a reservoir 36. A conduit 40 supplies the required fluid if the fluid is liquid, such as oil, to reservoir 36.

Valves 34 are connected to and controlled by a microprocessor 42. The lines connecting valves 34 to microprocessor 42 are not numbered to enhance the clarity of the drawing. Any suitable signal carrying lines could be used to connect valves 34 to microprocessor 42.

Further illustrated schematically in FIG. 5 are control valves 44 positioned at either end of double-ended cylinder 10 and in communication with the interior of double-ended cylinder 10. Control valves 44 are actuated and controlled on a continuous basis by microprocessor 42. Control valves 44 regulate and change pressures on either side of double-ended piston 12 as required to move double-ended piston 12 and then to retain double-ended piston 12 in a given position, thereby moving slide gate blade 24 through a continuum of positions, thereby facilitating extremely tight and precise control of the downward flow of granular resin or other granular material from hopper 18 into conduit 22.

In FIG. 5, conduit 22 has been depicted as a resin conveying conduit in which air at below atmospheric pressure is drawn through conduit 22 via a vacuum pump not shown in the direction indicated by arrow A. The rapidly moving air drawn by the vacuum created by the vacuum pump picks up granular resin that has passed through the slide gate and carries that granular resin material onward as indicated by arrow B and the legend "air-resin mixture" in FIG. 5.

In one manifestation of the invention, valves 34 are solenoid actuated valves operating in response to microprocessor 42, allowing pressurized air supplied through line 38 to contact either side of piston 12 within double-ended cylinder 10. If the pressure is equal on each side of double-ended piston 12, double-ended piston 12 does not move. If movement of piston 12 is desired, microprocessor 42, according to preprogrammed instructions, may open one of control valves 44 to move double-ended piston 12 in a desired direction to change the position of slide gate blade 24.

When the combination of the double-ended piston, the slide gate and the hopper are used in large and/or sophisticated resin material supply systems, feedback signals generated by flow sensors, and/or by granular material weight sensors, and/or by vacuum level sensors, may be provided to microprocessor 42 whereupon microprocessor 42 works to regulate operation of double-ended cylinder 10 via control valves 44, thereby to provide granular resin material through conduit 22 at a rate that is adjusted according to dynamic operating conditions of the material supply system.

The foregoing description of the specific embodiments of this invention fully reveals the general nature of the invention such that others of skill in the art, by applying current knowledge, may readily modify and/or adapt for various applications the specific embodiments working from the generic concepts and, therefore, such adaptations and modifications should be and are intended to be comprehended as being within the meaning and range of equivalents of the disclosed embodiments and attached claims.

It is to be understood that the phraseology or terminology employed herein is for the purpose of description and not of limitation.

It is further to be understood that the term "comprising" as used in the claims means "including but not limited to."

Any use of the term "consisting of" should be understood to mean including only the recited elements; the term "consisting of" is not used in the claims as currently filed.

Finally, while the preferred embodiments of the invention have been disclosed as set forth above in terms adequate to enable anyone skilled in the art to practice the invention, it is to be understood that the scope of the invention is defined by the claims that are appended hereto, and by equivalents thereof that perform the same function in the same way to achieve the same result as the claims herein.

We claim the following:

We claim the following:

1. Apparatus for continuously vertically delivering variably controlled amounts of granular resin material into a horizontal conduit carrying moving air for continuous pneumatic conveyance of the granular resin material, comprising:
    a) a hopper for storing the granular resin material, the hopper comprising a discharge opening leading vertically downwardly to an outlet at the hopper bottom for vertically downward flow of granular resin material out of the hopper a horizontal section of the pneumatic conveyance conduit, the outlet communicating with the horizontal section of the pneumatic conveyance conduit;
    b) a horizontally oriented double ended air cylinder;
    c) a piston within the air cylinder, the piston moving horizontally within the cylinder in response to differential pressures on either side of the piston;
    d) a passive piston rod extending horizontally from a first side of the piston out of one end of the cylinder;
    e) an active piston rod extending horizontally from a second side of the piston out of a second end of the cylinder;
    f) the active and passive piston rods being of the same diameter and axially aligned;
    g) a slide gate assembly comprising a housing and a horizontally and transversely elongated blade therewithin, the slide gate housing being connected to the hopper outlet intermediate the discharge opening and the horizontal section of the conveyance conduit; the slide gate housing having a vertical passageway therethrough aligned with the hopper outlet; the slide gate blade being connected to the active piston rod; the slide gate blade residing in the slide gate housing between the hopper discharge opening and the conduit and being movable horizontally within the housing responsively to the piston along a continuum of positions between a first extremity at which the slide gate housing vertical passageway is occluded by the slide gate blade so that no granular resin material can flow downward from the hopper outlet through the vertical passageway and a second extremity at which the slide gate housing vertical passageway is open and granular resin material can flow freely downwardly through the vertical passageway.

2. A method for continuously supplying controlled amounts of granular resin material to a horizontal section of a pneumatic conveyance conduit for continuous pneumatic conveyance of the granular resin material through the conduit, comprising:
    a) providing a hopper for storage of the granular resin material therein, the hopper having a discharge opening leading vertically downwardly to an outlet at the hopper bottom for gravity induced downward flow of granular resin material out of the hopper into the horizontal section of the pneumatic conveyance conduit;
    b) providing a double ended cylinder;
    c) positioning a piston within the cylinder, the piston being movable within the cylinder in response to differential pressure on either side of the piston;
    d) pressurizing the cylinder with pressure on either side of the piston;
    e) providing a first piston rod extending from one side of the piston slidably through an end of the cylinder facing the portion of the piston from which the passive piston rod extends;
    f) providing a second piston rod extending from an opposite side of the piston slideably through a second end of the cylinder, the piston rods being of the same diameter and being axially aligned;
    g) providing a slide gate assembly consisting of a slide gate housing and a slide gate blade positioned in the slide gate housing, the slide gate housing connecting to the hopper outlet intermediate the discharge opening and the conveyance conduit; the slide gate housing having a vertical passageway therethrough aligned with the hopper outlet, the slide gate blade being movable continuously between a piston position blocking downward granular resin material flow from the hopper outlet and a position removed from the hopper outlet thereby permitting downward granular resin material flow from the outlet; the slide gate blade residing slideably in the slide gate housing between the hopper discharge opening and the pneumatic conveyance conduit;
h) connecting the slide gate blade to one of the piston rods;
i) moving the piston by adjusting differential pressure thereon until the piston reaches a position resulting in the desired flow rate of granular resin material out of the hopper through the slide gate and into the conveyance conduit; and
j) regulating the flow of granular resin material in the conveyance conduit through adjusting position of the piston by adjusting differential pressure on the piston surfaces in response to feedback signals indicative of dynamic granular resin material flow in the conveyance conduit.

3. Apparatus for continuously delivering variably controlled amounts of granular resin material to a conduit for pneumatic conveyance of the granular resin material therethrough, comprising:
  a) a hopper for storing the granular resin material, having an outlet at the hopper bottom for downward flow of granular resin material downwardly out of the hopper into the conduit;
  b) a supply of pressurized fluid;
  c) an double ended cylinder;
  d) a piston within the cylinder, the piston moving within the cylinder in response to differential pressure on either side of the piston;
  e) first valves in the cylinder, one valve on either side of the piston, each connected to the fluid supply for furnishing pressurized fluid to the cylinder interior on opposite sides of the piston;
  f) control valves in the cylinder, one control valve on either side of the piston, for exhausting pressurized fluid from the respective sides of the cylinder to atmosphere;
  g) a first piston rod extending from a first side of the piston through one end of the cylinder;
  h) a second piston rod extending from a second side of the piston through a second end of the cylinder;
  i) the piston rods being of common diameter;
  j) a slide gate having a housing and a flat, horizontally elongated blade therewithin, the slide gate connecting to the hopper and being positioned intermediate the hopper outlet and the conduit; the slide gate having a horizontal passageway therethrough aligned with the hopper outlet; the slide gate blade connecting with one of the piston rods, residing between the hopper outlet and the conduit, and being movable responsively to the piston to regulate the size of the passageway through the slide gate; and
  k) a microprocessor connected to the first valves, to the control valves, and to at least one physical parameter sensor connected to the hopper, for regulating granular resin material flow out of the hopper, through the slide gate and into the conveying conduit by positioning the piston connected to the slide gate in response to differential pressure on the piston by adjusting the control valves to exhaust to atmosphere in response to signal from the sensor.

4. The method of claim 2 where the differential pressures on the piston surfaces are adjusted by exhausting fluid from the cylinder.

5. The method of claim 2 wherein the fluid is air.

6. The method of claim 2 wherein the fluid is oil.

7. The method of claim 3 wherein the physical parameter sensor is selected from the group consisting of flow sensors, granular material weight sensors, and vacuum level sensors.

8. A method for continuously supplying controlled amounts of granular resin material from a pneumatic conveyance conduit for pneumatic conveyance of the granular resin material through the conduit, comprising:
  a) providing a storage hopper having the granular resin material therein with a discharge opening at the hopper bottom for downward flow of granular resin material out of the hopper and a valve at the discharge opening for controlling downward granular resin material flow from the hopper;
  b) providing a double ended air cylinder;
  c) positioning a piston within the air cylinder, the piston being movable within the cylinder in response to differential pressure on either side of the piston;
  d) providing piston rods extending from opposite sides of the piston slideably through opposite ends of the cylinder;
  e) the piston rods being of the same diameter;
  f) connecting the valve to one of the piston rods;
  g) applying first differential pressures on either side of the piston;
  h) moving the piston by adjusting differential first pressures thereon until the piston reaches a position resulting in the desired flow rate of granular resin material out of the hopper;
  i) continuously regulating flow of granular resin material out of the hopper through continuously adjusting position of the piston by continuously adjusting differential pressures on the piston surfaces by exhausting fluid from the cylinder in response to at least one feedback signal indicative of condition of granular resin material flow out of the hopper.

9. In apparatus for delivering granular resin material vertically downwardly out of a hopper into a horizontal conduit for pneumatic conveyance of granular resin material therethrough, the hopper having a slide gate valve having a housing, a horizontally elongated blade therewithin, and a pneumatic piston-cylinder combination connected to the valve for blocking or permitting the granular resin material downward flow out of the hopper outlet and through a passageway in the slide gate valve according to position of the piston moving within the cylinder, the cylinder being a double ended cylinder having the piston within the cylinder in response to differential pressure on either side of the piston, the cylinder including first and second piston rods of common diameter extending from respective sides of the piston through ends of the cylinder; the slide gate valve being connected to the hopper and positioned below the hopper outlet, with the passageway through the slide gate valve being aligned with the hopper outlet, the slide gate valve blade being connected with one of the piston rods; the slide gate valve blade residing below the hopper outlet and being moveable horizontally responsively to the piston to regulate the size of the passageway through the slide gate, the horizontal conduit being continuously open for pneumatic conveyance of granular resin material therethrough regardless of piston position within the cylinder, the improvement comprising:
  a) a sensor connected to the hopper for detecting level of granular resin material therein;
  b) control valves in the cylinder, one control valve on either side of the piston, for relieving pressurized fluid out of the cylinder from respective sides of the piston; and, c) a microprocessor connected to control valves, and connected to the sensor, for regulating granular resin material flow downwardly out of the hopper outlet through the slide gate passageway by continuously positioning the piston connected to the slide gate to continuously regulate the size of the slide gate passageway by controlling differential pressure on the piston through adjustment of the control valves in response to signal from the sensor.

10. In a method for continuously supplying controlled amounts of granular resin material from a storage hopper to a pneumatic conveyance conduit having an airstream flowing therethrough for pneumatic conveyance of the granular resin material through the conduit, the hopper having a valve in a downwardly opening outlet from the storage hopper and a double ended piston-cylinder combination resident in the cylinder, a piston of the piston-cylinder combination being connected to the valve, the method including positioning the piston within the air cylinder in response to differential pressure on either side of the piston with common diameter piston rods extending from opposite sides of the piston slideably through opposite ends of the cylinder;

the improvement comprising:
  a) moving the piston horizontally by adjusting differential pressure on either side of the piston until the piston reaches a position resulting in the desired flow rate of granular resin material downwardly out of the hopper into the pneumatic conveyance conduit; and
  b) continuously regulating downward flow of granular resin material out of the hopper into the horizontal pneumatic conveyance conduit through adjusting position of the piston by adjusting differential pressures on the piston in response to at least one feedback signal indicative of status of granular resin material flow out of the hopper.

11. In a method for continuously supplying controlled amounts of granular resin material from a storage hopper to a pneumatic conveyance conduit having an airstream flowing therethrough for pneumatic conveyance of the granular resin material through the conduit, the hopper having a valve in a downwardly opening outlet from the storage hopper and a double ended piston-cylinder combination resident in the cylinder, a piston of the piston-cylinder combination being connected to the valve, the method including positioning the piston within the air cylinder in response to differential pressure on either side of the piston with common diameter piston rods extending from opposite sides of the piston slideably through opposite ends of the cylinder;

the improvement comprising:
  a) moving the piston horizontally by adjusting differential pressure on the piston until the piston reaches a position resulting in the desired flow rate of granular resin material downwardly out of the hopper into the horizontal pneumatic conveyance conduit; and
  b) regulating downward flow of granular resin material out of the hopper into the pneumatic conveyance conduit through adjusting position of the piston by adjusting differential pressures on the piston in response to at least one signal indicative of status of granular resin material conveyance in the conduit.

12. The improved method of claim 10 wherein piston position is adjusted continuously by adjusting differential pressures on at least one surface of the piston.

13. The improved method of claim 10 wherein piston position is adjusted continuously by adjusting differential pressures on both surfaces of the piston.

14. The improved method of claim 11 wherein piston position is adjusted by continuously adjusting differential pressures on at least one surface of the piston.

15. The improved method of claim 11 wherein piston position is adjusted continuously by adjusting differential pressures on both surfaces of the piston.

* * * * *